United States Patent
Yamamoto

(10) Patent No.: US 7,164,834 B2
(45) Date of Patent: Jan. 16, 2007

(54) DISPERSION-COMPENSATING FIBER, DISPERSION COMPENSATOR, AND OPTICAL TRANSMISSION LINE

(75) Inventor: Yoshinori Yamamoto, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/073,725

(22) Filed: Mar. 8, 2005

(65) Prior Publication Data
US 2005/0201703 A1    Sep. 15, 2005

(30) Foreign Application Priority Data
Mar. 10, 2004 (JP) .............................. 2004-067862

(51) Int. Cl.
*G02B 6/22* (2006.01)
(52) U.S. Cl. ...................................... 385/127
(58) Field of Classification Search ................ 385/123, 385/124, 126, 127
See application file for complete search history.

(56) References Cited

U.S. PATENT DOCUMENTS

| | | | |
|---|---|---|---|
| 5,878,182 A * | 3/1999 | Peckham .................... 385/123 |
| 6,490,398 B1 * | 12/2002 | Gruner-Nielsen et al. .. 385/123 |
| 6,574,407 B1 | 6/2003 | Sillard et al. |
| 6,603,914 B1 * | 8/2003 | Edvold et al. ............... 385/127 |
| 2004/0146258 A1 | 7/2004 | Yamamoto et al. |

* cited by examiner

*Primary Examiner*—Sarah Song
(74) *Attorney, Agent, or Firm*—McDermott Will & Emery LLP

(57) ABSTRACT

A dispersion-compensating fiber having a figure of merit of at least 200 ps/nm/dB and an absolute value of relative dispersion curvature of at most $10^{-4} nm^{-2}$ both at a wavelength of 1550 nm, a dispersion compensator, and an optical transmission line are provided for large-capacity optical transmission. The dispersion-compensating fiber has a first core region with a refractive index of $n_1$, a second core region surrounding the first core region with a $n_2$ ($n_1 > n_2$), a third core region surrounding the second core region with a $n_3$ ($n_2 < n_3$), and a 50 cladding region surrounding the third core region with a $n_4$ ($n_3 > n_4$). With reference to $n_4$, the first core region has a relative refractive-index difference of 2.0% to 3.3%, the second core region of −1.5% to −0.2%, and the third core region of 0.2% to 0.5%.

14 Claims, 6 Drawing Sheets

DISPERSION-COMPENSATING FIBER, DISPERSION COMPENSATOR, AND OPTICAL TRANSMISSION LINE

BACKGROUND OF THE INVENTION

1. Field of the Invention

The present invention relates to a dispersion-compensating fiber, a dispersion compensator, and an optical transmission line that has a signal-transmitting fiber and a dispersion-compensating fiber.

2. Description of the Background Art

An optical transmission line for transmitting a signal lightwave in an optical transmission system is required to have a small insertion loss and a small absolute value of overall dispersion in the wavelength band for the signal lightwave so that a large volume of information can be transmitted. It is difficult to reduce the absolute value of overall dispersion of an optical transmission line by using only a single type of optical fiber. Consequently, the absolute value of overall dispersion is reduced by connecting a plurality of types of optical fibers (see U.S. Pat. No. 6,574,407, for example).

More specifically, to reduce the absolute value of overall dispersion of an optical transmission line in the wavelength band for the signal lightwave, the following two types of optical fibers are connected in series with a proper ratio in length: one is a signal-transmitting fiber having a positive chromatic dispersion in the wavelength band for the signal lightwave and the other is a dispersion-compensating fiber having a negative chromatic dispersion in the wavelength band for the signal lightwave. In this case, when the signal-transmitting fiber and the dispersion-compensating fiber have a dispersion slope different in sign from each other, the absolute value of overall dispersion of the optical transmission line can be reduced in a broad wavelength band.

However, conventional dispersion-compensating fibers, including the optical transmission line disclosed in the foregoing U.S. Pat. No. 6,574,407, cannot sufficiently reduce both the insertion loss and the absolute value of overall dispersion of an optical transmission line in a broad wavelength band. Therefore, they are not adequate to be used for large-capacity optical transmission.

SUMMARY OF THE INVENTION

An object of the present invention is to offer a dispersion-compensating fiber, a dispersion compensator, and an optical transmission line all suitable to be used for large-capacity optical transmission.

To attain the foregoing object, the present invention offers a dispersion-compensating fiber that has the following regions:

(a) a first core region that includes the center axis and that has a refractive index of $n_1$;

(b) a second core region that surrounds the first core region and that has a refractive index of $n_2$;

(c) a third core region that surrounds the second core region and that has a refractive index of $n_3$; and (d) a cladding region that surrounds the third core region and that has a refractive index of $n_4$.

The refractive indexes have the following features and relationships:

(a) the first core region has a refractive-index profile, and the refractive index $n_1$ denotes the maximum value in the profile;

(b) the refractive index $n_2$ has the relationship $n_1 > n_2$;

(c) the refractive index $n_3$ has the relationship $n_2 < n_3$; and (d) the refractive index $n_4$ has the relationship $n_3 > n_4$.

With reference to the refractive index $n_4$, the core regions have the following relative refractive-index differences:

(a) the first core region has a relative refractive-index difference of at least 2.0% and at most 3.3%;

(b) the second core region has a relative refractive-index difference of at least −1.5% and at most −0.2%; and (c) the third core region has a relative refractive-index difference of at least 0.2% and at most 0.5%.

The dispersion-compensating fiber has a figure of merit (FOM) of at least 200 ps/nm/dB and an absolute value of relative dispersion curvature (RDC) of at most $10^{-4}$ nm$^{-2}$ both at a wavelength of 1550 nm.

In accordance with an aspect of the present invention, the present invention offers a dispersion-compensating fiber that has a relative dispersion slope (RDS) of at least 0.005 nm$^{-1}$ and at most 0.009 nm$^{-1}$ and an FOM of at least 200 ps/nm/dB both at a wavelength of 1550 nm. In this section of "SUMMARY," this dispersion-compensating fiber is referred to as a "dispersion-compensating fiber of the second mode of the present invention."

In accordance with another aspect of the present invention, the present invention offers a dispersion compensator that has a dispersion-compensating fiber of the present invention, which is wound in the shape of a coil. In accordance with yet another aspect of the present invention, the present invention offers a dispersion compensator that has the following properties:

(a) an insertion loss of at most $-0.004 \cdot D_{DCF} + 0.4$ (dB) at a wavelength of 1550 nm, where $D_{DCF}$ (ps/nm) is the overall dispersion of the dispersion compensator at a wavelength of 1550 nm;

(b) an RDS of at least 0.005 nm$^{-1}$ and at most 0.009 nm$^{-1}$ at a wavelength of 1550 nm; and (c) an absolute value of RDC of at most $10^{-4}$ nm$^{-2}$ at a wavelength of 1550 nm.

In accordance with yet another aspect of the present invention, the present invention offers an optical transmission line that is installed in a relay section and that has a dispersion-compensating fiber of the present invention. In accordance with yet another aspect of the present invention, the present invention offers an optical transmission line that has the following fibers:

(a) a signal-transmitting fiber having a chromatic dispersion of at least 3.0 ps/nm/km and at most 5.5 ps/nm/km and an RDS of at least 0.005 nm$^{-1}$ and at most 0.009 nm$^{-1}$ both at a wavelength of 1550 nm; and (b) the above-described dispersion-compensating fiber of the second mode of the present invention that is connected to the signal-transmitting fiber.

In this optical transmission line, the signal-transmitting fiber and the dispersion-compensating fiber are installed in a relay section.

In accordance with yet another aspect of the present invention, the present invention offers an optical transmission line that has the following members:

(a) a signal-transmitting fiber having a transmission loss of at most 0.24 dB/km at a wavelength of 1550 nm; and (b) a dispersion compensator that is connected to the signal-transmitting fiber to compensate its chromatic dispersion.

In the optical transmission line, the dispersion compensator has an insertion loss of at most 0.005·Dt·L+0.4 (dB) at a wavelength of 1550 nm and the optical transmission line has an absolute value of overall dispersion of at most 0.01·Dt·L (ps/nm) in a wavelength range of at least 1530 nm and at most 1565 nm, where Dt (ps/nm/km) is the chromatic dispersion of the signal-transmitting fiber at a wavelength of 1550 nm and L (km) is the length of the signal-transmitting fiber.

Advantages of the present invention will become apparent from the following detailed description, which illustrates the best mode contemplated to carry out the invention. The invention can also be carried out by different embodiments, and its several details can be modified in various respects, all without departing from the invention. Accordingly, the accompanying drawing and the following description are illustrative in nature, not restrictive.

BRIEF DESCRIPTION OF THE DRAWING

The present invention is illustrated to show examples, not to show limitations, in the figures of the accompanying drawing. In the drawing, the same reference numeral and sign refer to a similar element.

In the drawing:

FIGS. 1A and 1B are conceptual diagrams showing an embodiment of a dispersion-compensating fiber of the present invention, in which FIG. 1A shows a cross section perpendicular to the axis of the optical fiber and FIG. 1B shows a cross section including the axis of the optical fiber.

DETAILED DESCRIPTION OF THE INVENTION

Figure 1B:
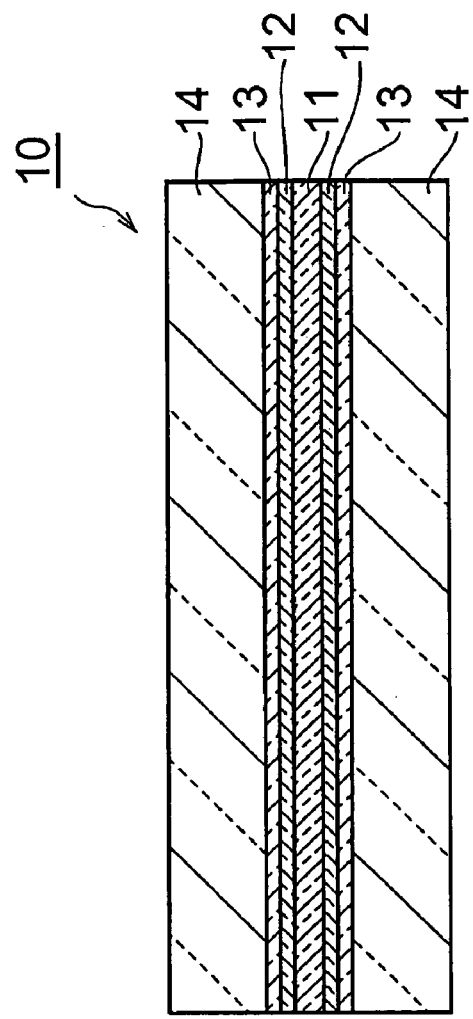
Figure 1A:
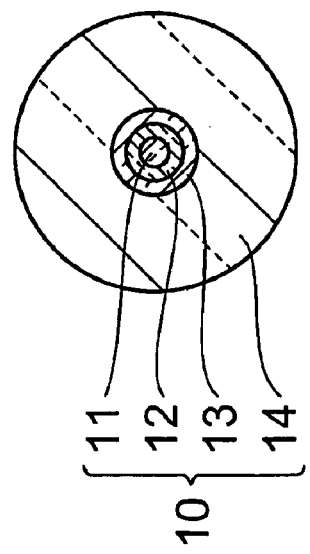
Figure 2:
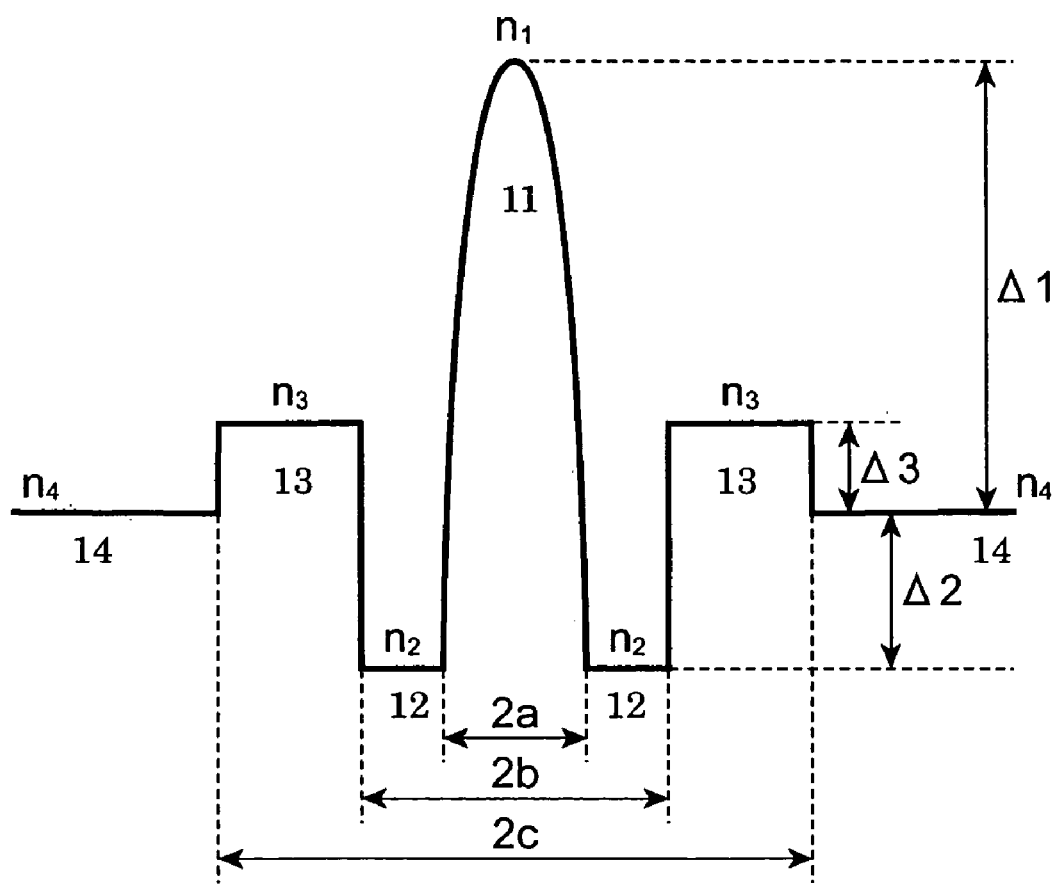
FIG. 2 is a diagram showing the refractive-index profile of an embodiment of a dispersion-compensating fiber of the present invention.

FIGS. 1A and 1B are conceptual diagrams showing an embodiment of a dispersion-compensating fiber of the present invention. FIG. 1A shows a cross section perpendicular to the axis of the optical fiber, and FIG. 1B shows a cross section including the axis of the optical fiber. FIG. 2 is a diagram showing the refractive-index profile of an embodiment of a dispersion-compensating fiber of the present invention.

A dispersion-compensating fiber 10 has a first core region 11 that includes the center axis and that has a refractive index of $n_1$, which denotes the maximum value in the refractive-index profile in the first core region, a second core region 12 that surrounds the first core region 11 and that has a maximum refractive index of $n_2$, which has the relationship $n_1 > n_2$, a third core region 13 that surrounds the second core region 12 and that has a refractive index of $n_3$, which has the relationship $n_2 < n_3$, and a cladding region 14 that surrounds the third core region 13 and that has a refractive index of $n_4$, which has the relationship $n_3 > n_4$.

The dispersion-compensating fiber 10 having the above-described refractive-index profile can be produced by the following method, for example:

(a) silica glass is used as the host material;

(b) the first core region 11 and the third core region 13 are doped with a proper amount of a refractive-index-increasing agent such as $GeO_2$; and (c) the second core region 12 is doped with a proper amount of a refractive-index-decreasing agent such as the element F.

In the dispersion-compensating fiber 10, with reference to the refractive index $n_4$ of the cladding region, the relative refractive-index difference $\Delta 1$ of the first core region lies in the range of 2.0% to 3.3%, the relative refractive-index difference $\Delta 2$ of the second core region lies in the range of −1.5% to −0.2%, and the relative refractive-index difference $\Delta 3$ of the third core region lies in the range of 0.2% to 0.5%.

The dispersion-compensating fiber 10 has a negative chromatic dispersion and a negative dispersion slope both at a wavelength of 1550 nm. The dispersion-compensating fiber 10 has a figure of merit (FOM) of at least 200 ps/nm/dB and an absolute value of relative dispersion curvature (RDC) of at most $10^{-4}$ nm$^{-2}$ both at a wavelength of 1550 nm. It is desirable that the dispersion-compensating fiber 10 have a relative dispersion slope (RDS) of 0.005 to 0.009 nm$^{-1}$ at a wavelength of 1550 nm.

In the dispersion-compensating fiber 10, the wavelength $\lambda$, the transmission loss $\alpha$ (dB/km), the chromatic dispersion D, the dispersion slope S, and the dispersion curvature C have the relationships shown in the following equations (1A) to (1E):

$$S = \frac{dD}{d\lambda} \tag{1A}$$

$$C = \frac{dS}{d\lambda} = \frac{d^2 D}{d\lambda^2} \tag{1B}$$

$$FOM = \frac{|D|}{\alpha} \tag{1C}$$

$$RDS = \frac{S}{D} \tag{1D}$$

$$RDC = \frac{C}{D} \tag{1E}$$

The dispersion-compensating fiber 10 having the above-described properties has a large FOM and a small absolute value of RDC both at a wavelength of 1550 nm. Therefore, it can sufficiently reduce both the insertion loss and the absolute value of overall dispersion of the optical transmission line in a broad wavelength band. In other words, it is suitable to be used for large-capacity optical transmission.

In addition, it is desirable that in the dispersion-compensating fiber 10, the ratio of the outer diameter 2a of the first core region 11 to the outer diameter 2c of the third core region 13, which ratio is a/c, lie in the range of 0.15 to 0.30 and the ratio of the outer diameter 2b of the second core region 12 to the outer diameter 2c of the third core region 13, which ratio is b/c, lie in the range of 0.40 to 0.64. This condition is advantageous in achieving the above-described FOM and RDC.

In addition, it is desirable that in the dispersion-compensating fiber 10, when the fiber is wound with a diameter of 120 mm, the bending loss be at most 0.1 dB/km at a wavelength of 1630 nm. In this case, when the fiber is wound in the shape of a coil to form a module, an increase in the loss is small. Therefore, this condition is advantageous in structuring a dispersion compensator. In addition, it is desirable that the mode-field diameter defined by Petermann I be at most 14.5 μm at a wavelength of 1630 nm. In this case, an increase in the loss due to microbending is small. Therefore, this condition is also advantageous in structuring a dispersion compensator.

The dispersion-compensating fiber 10 may have an RDS of 0.005 to 0.009 $nm^{-1}$ and an FOM of at least 200 ps/nm/dB both at a wavelength of 1550 nm. In this case, also, it can sufficiently reduce both the insertion loss and the absolute value of overall dispersion of the optical transmission line in a broad wavelength band. In other words, it is suitable to be used for large-capacity optical transmission.

Figure 3:
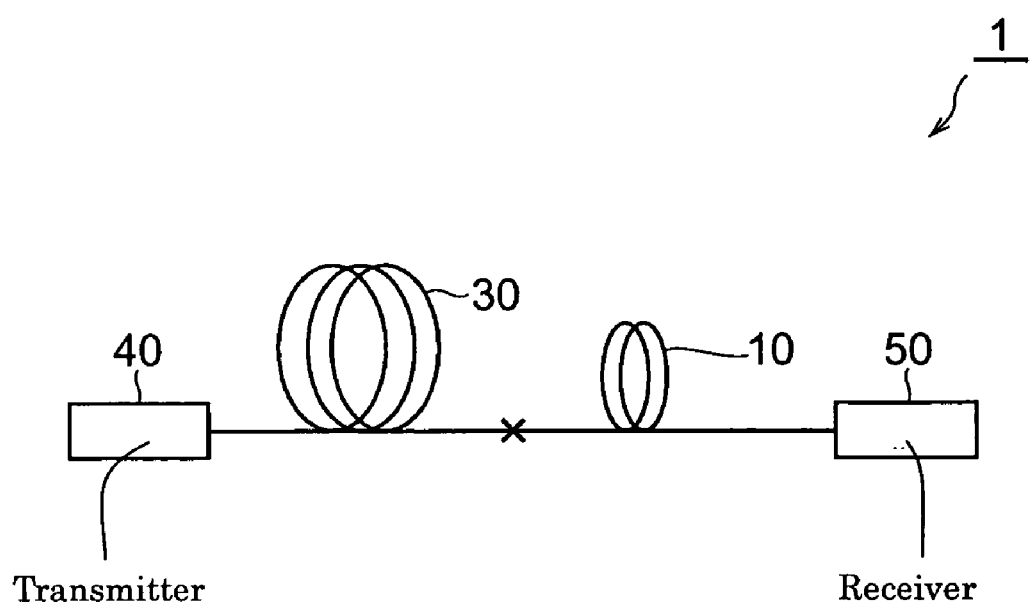
FIG. 3 is a conceptual diagram showing an optical transmission system that includes an embodiment of an optical transmission line of the present invention.

FIG. 3 is a conceptual diagram showing an optical transmission system 1 that includes an embodiment of an optical transmission line of the present invention. In the optical transmission system 1, an optical transmission line is formed by connecting a signal-transmitting fiber 30 and a dispersion-compensating fiber 10. The optical transmission line is installed in a relay section between a transmitter 40 and a receiver 50. A signal lightwave sent out from the transmitter 40 travels over the signal-transmitting fiber 30 and the dispersion-compensating fiber 10 and, then, is received by the receiver 50.

The signal-transmitting fiber 30 has a positive chromatic dispersion and a positive dispersion slope both at a wavelength of 1550 nm. More specifically, the signal-transmitting fiber 30 has a chromatic dispersion of 3.0 to 5.5 ps/nm/km and an RDS of 0.005 to 0.009 $nm^{-1}$ both at a wavelength of 1550 nm. The optical transmission line having the signal-transmitting fiber 30 and the dispersion-compensating fiber 10 sufficiently reduces both the insertion loss and the absolute value of overall dispersion in a broad wavelength band. In other words, it is suitable to be used for large-capacity optical transmission.

It is desirable that when the signal-transmitting fiber 30 has a chromatic dispersion of Dt (ps/nm/km) at a wavelength of 1550 nm and a length of L (km), the optical transmission line having the signal-transmitting fiber 30 and the dispersion-compensating fiber 10 have an absolute value of overall dispersion of at most 0.01·Dt·L (ps/nm) in a wavelength range of 1530 to 1565 nm. For example, when the signal-transmitting fiber 30 has a chromatic dispersion, Dt, of 4 ps/nm/km at a wavelength of 1550 nm and a length, L, of 100 km, it is desirable that the optical transmission line have an absolute value of overall dispersion of at most 4 ps/nm in a wavelength range of 1530 to 1565 nm.

It is more desirable that the optical transmission line have an absolute value of overall dispersion of at most 0.005·Dt·L (ps/nm) in a wavelength range of 1530 to 1565 nm. For example, when the signal-transmitting fiber 30 has a chromatic dispersion, Dt, of 4 ps/nm/km at a wavelength of 1550 nm and a length, L, of 100 km, it is desirable that the optical transmission line have an absolute value of overall dispersion of at most 2 ps/nm in a wave-length range of 1530 to 1565 nm.

Figure 4:
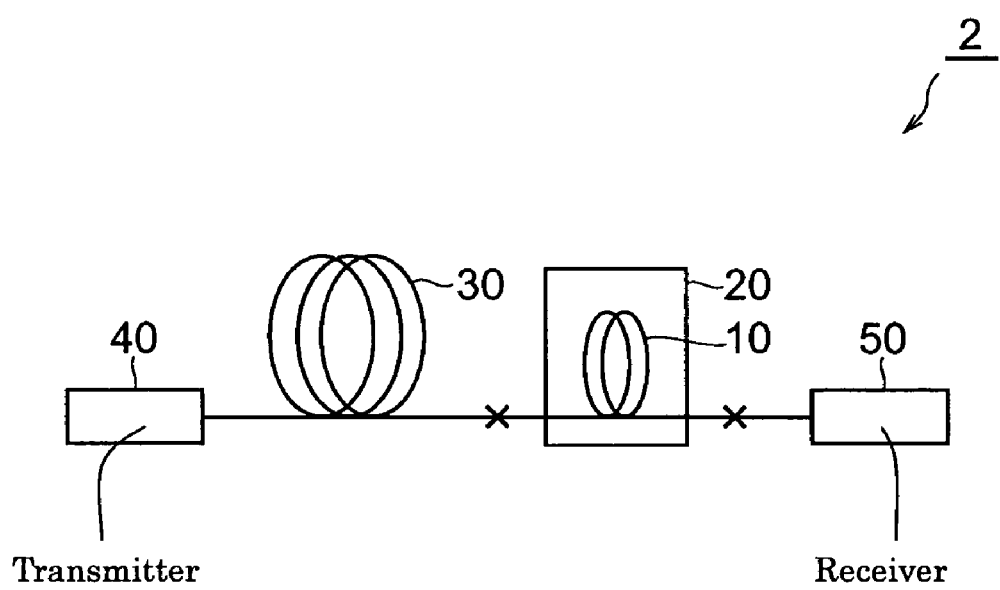
FIG. 4 is a conceptual diagram showing another optical transmission system that includes an embodiment of an optical transmission line of the present invention.

FIG. 4 is a conceptual diagram showing another optical transmission system 2 that includes an embodiment of an optical transmission line of the present invention. In the optical transmission system 2, a signal-transmitting fiber 30 is installed in a relay section between a transmitter 40 and a receiver 50, and a dispersion compensator 20 is provided in front of the receiver 50. A signal lightwave sent out from the transmitter 40 travels over the signal-transmitting fiber 30, is dispersion-compensated by the dispersion compensator 20, and, then, is received by the receiver 50.

The signal-transmitting fiber 30 has a transmission loss of at most 0.24 dB/km at a wavelength of 1550 nm. When the signal-transmitting fiber 30 has a chromatic dispersion of Dt (ps/nm/km) at a wavelength of 1550 nm and a length of L (km), the dispersion compensator 20 has an insertion loss of at most 0.005·Dt·L+0.4 (dB) at a wavelength of 1550 nm, and the optical transmission line having the signal-transmitting fiber 30 and the dispersion compensator 20 has an absolute value of overall dispersion of at most 0.01·Dt·L (ps/nm) in a wavelength range of 1530 to 1565 nm. The optical transmission line having the signal-transmitting fiber 30 and the dispersion compensator 20 sufficiently reduces both the insertion loss and the absolute value of overall dispersion in a broad wavelength band. In other words, it is suitable to be used for large-capacity optical transmission.

The dispersion compensator 20 is a module in which the dispersion-compensating fiber 10 is wound in the shape of a coil. It is desirable that when its overall dispersion at a wavelength of 1550 nm is expressed as $D_{DCF}$ (ps/nm), the dispersion compensator 20 have an insertion loss of at most $-0.005 \cdot D_{DCF}+0.4$ (dB) at a wavelength of 1550 nm. In addition, it is desirable that the dispersion compensator 20 have an RDS of 0.005 to 0.009 $nm^{-1}$ at a wavelength of 1550 nm.

In addition, it is desirable that when the overall dispersion at a wavelength of 1550 nm is expressed as $D_{DCF}$ (ps/nm), the product of the nonlinearity coefficient γ and the fiber's effective length $L_{eff}$ be at most $-0.04 \cdot D_{DCF}$ (rad/W) at a wavelength of 1550 nm. In this case, nonlinear optical phenomena are suppressed from developing at the dispersion compensator 20.

The amount of nonlinear phase shift Φ (rad) produced in the dispersion compensator 20 due to nonlinear optical phenomena is expressed by Eqs. (2A) to (2C) using the wavelength λ; the nonlinear refractive index $n_2$, the effective core area $A_{eff}$, the length L, and the transmission loss α (dB/km) of the dispersion-compensating fiber 10; and the optical power $P_0$ inputted into the dispersion-compensating fiber 10.

$$\Phi = \gamma L_{eff} P_0 \qquad (2A)$$

$$\gamma = \frac{2\pi}{\lambda} \frac{n_2}{A_{eff}} \qquad (2B)$$

$$L_{eff} = \frac{1 - \exp(-\alpha L)}{\alpha} \qquad (2C)$$

When its overall dispersion at a wavelength of 1550 nm is expressed as $D_{DCF}$ (ps/nm), the dispersion compensator 20 has an insertion loss of at most $-0.004 \cdot D_{DCF} + 0.4$ (dB) at a wavelength of 1550 nm, an RDS of 0.005 to 0.009 nm$^{-1}$ at a wavelength of 1550 nm, and an absolute value of RDC of at most $10^{-4}$ nm$^{-2}$ at a wavelength of 1550 nm. The use of the dispersion compensator 20 having the above-described properties sufficiently reduces both the insertion loss and the absolute value of overall dispersion of the optical transmission line in a broad wavelength band. In other words, the dispersion compensator 20 is suitable to be used for large-capacity optical transmission.

Figure 5:
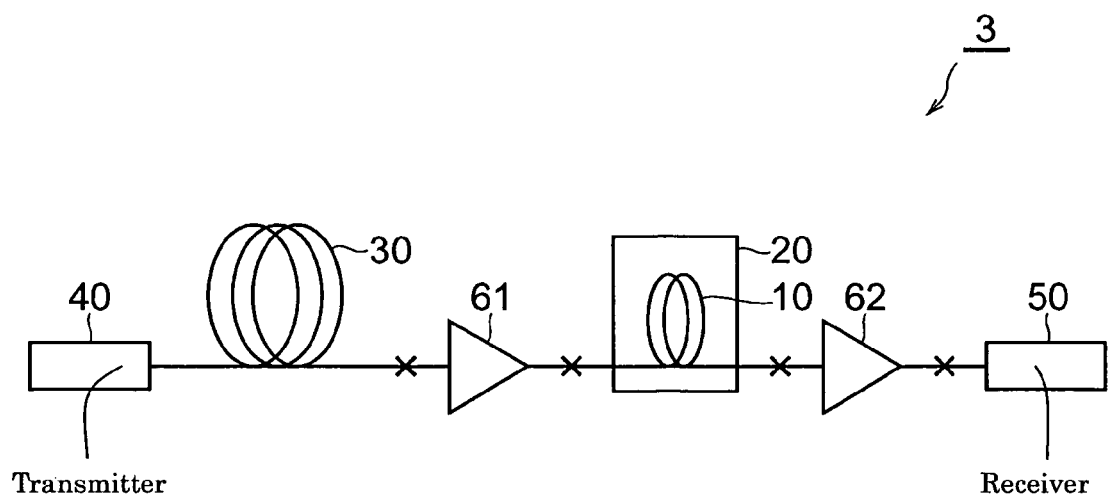
FIG. 5 is a conceptual diagram showing yet another optical transmission system that includes an embodiment of an optical transmission line of the present invention.

FIG. 5 is a conceptual diagram showing yet another optical transmission system 3 that includes an embodiment of an optical transmission line of the present invention. In the optical transmission system 3, in the path for a signal lightwave to travel from a transmitter 40 to a receiver 50, a signal-transmitting fiber 30, an optical amplifier 61, a dispersion compensator 20, and an optical amplifier 62 are provided. A signal lightwave sent out from the transmitter 40 travels over the signal-transmitting fiber 30, is optically amplified by the optical amplifier 61, is dispersion-compensated by the dispersion compensator 20, is optically amplified by the optical amplifier 62, and, then, is received by the receiver 50.

The dispersion compensator 20 in this optical transmission system 3 is similar to the dispersion compensator 20 in the above-described optical transmission system 2. In particular, this optical transmission system 3 is provided with the optical amplifier 61 in front of the dispersion compensator 20. Consequently, the power of the light entering the dispersion compensator 20 is large. Nevertheless, because the product of the nonlinearity coefficient $\gamma$ and the fiber's effective length $L_{eff}$ is at most $-0.04 \cdot D_{DCF}$ (rad/W), nonlinear optical phenomena are suppressed from developing at the dispersion compensator 20.

EXAMPLE

Next, examples of the dispersion-compensating fiber, dispersion compensator, and optical transmission line of the above-described embodiments are explained below.

Table I shows the values of the following properties of DCF1 to DCF13, which are examples of the dispersion-compensating fiber 10:

- the relative refractive-index difference Δ1 of the first core region 11;
- the relative refractive-index difference Δ2 of the second core region 12;
- the relative refractive-index difference Δ3 of the third core region 13;
- the ratio of the outer diameter of the first core region 11 to that of the third core region 13, which is a/c;
- the ratio of the outer diameter of the second core region 12 to that of the third core region 13, which is b/c;
- the chromatic dispersion $D_{DCF}$, the dispersion slope $S_{DCF}$, the dispersion curvature $C_{DCF}$, the RDS, the RDC, the transmission loss $\alpha_{DCF}$, and the FOM all at a wavelength of 1550 nm;
- the mode-field diameter MDF defined by Petermann I at a wavelength of 1630 nm; and
- the bending loss at a wavelength of 1630 nm when the fiber is wound with a diameter of 120 mm.

TABLE I

| | Δ1% | Δ2% | Δ3% | a/c | b/c | 2c μm | $D_{DCF}$ ps/nm/km | $S_{DCF}$ ps/nm²/km | $C_{DCF}$ ps/nm³/km | RDS $10^{-2}$ nm$^{-1}$ | RDC $10^{-5}$ nm$^{-2}$ | αDCF dB/km | FOM ps/nm/dB | MFD1 μm | Bending loss dB/km |
|---|---|---|---|---|---|---|---|---|---|---|---|---|---|---|---|
| DCF1 | 2.70 | −0.70 | 0.30 | 0.198 | 0.530 | 14.30 | −277.2 | −1.687 | 0.0045 | 0.61 | −1.61 | 0.916 | 303 | 11.88 | <0.1 |
| DCF2 | 2.70 | −0.70 | 0.30 | 0.183 | 0.510 | 15.40 | −345.2 | −2.506 | 0.0200 | 0.73 | −580 | 0.916 | 377 | 14.09 | <0.1 |
| DCF3 | 2.70 | −0.70 | 0.30 | 0.195 | 0.558 | 14.28 | −311.4 | −2.288 | 0.0049 | 0.73 | −1.57 | 0.916 | 340 | 13.49 | <0.1 |
| DCF4 | 2.70 | −0.70 | 0.30 | 0.200 | 0.568 | 14.02 | −267.9 | −1.991 | −0.0068 | 0.74 | 2.45 | 0.916 | 293 | 12.13 | <0.1 |
| DCF5 | 2.71 | −0.68 | 0.45 | 0.179 | 0.512 | 15.41 | −258.8 | −2.311 | −0.0014 | 0.89 | 5.40 | 0.820 | 316 | 12.20 | <0.1 |
| DCF6 | 2.70 | −0.70 | 0.30 | 0.188 | 0.540 | 15.18 | −247.8 | −2.231 | −0.0094 | 0.90 | 7.83 | 0.988 | 251 | 11.79 | <0.1 |
| DCF7 | 2.78 | −0.80 | 0.33 | 0.177 | 0.518 | 15.81 | −275.8 | −2.227 | 0.0055 | 0.81 | −1.98 | 0.791 | 349 | 13.51 | <0.1 |
| DCF8 | 2.71 | −0.68 | 0.45 | 0.179 | 0.512 | 15.17 | −284.4 | −2.291 | 0.0112 | 0.81 | −3.92 | 0.950 | 299 | 13.18 | <0.1 |
| DCF9 | 2.70 | −0.70 | 0.30 | 0.203 | 0.525 | 13.74 | −308.3 | −0.988 | 0.0257 | 0.32 | −8.33 | 0.905 | 341 | 14.71 | <0.1 |
| DCF10 | 2.70 | −0.70 | 0.30 | 0.178 | 0.533 | 15.76 | −382.9 | −3.781 | −0.0014 | 1.04 | 3.83 | 0.970 | 374 | 15.40 | <0.1 |
| DCF11 | 2.78 | −0.80 | 0.33 | 0.177 | 0.520 | 15.53 | −343.1 | −1.350 | −0.0124 | 0.39 | 3.61 | 0.691 | 497 | 15.18 | <0.1 |
| DCF12 | 2.70 | −0.50 | 0.30 | 0.173 | 0.610 | 15.10 | −308.2 | −2.257 | 0.0086 | 0.73 | −2.79 | 0.879 | 351 | 15.17 | 0.8 |
| DCF13 | 2.40 | −0.50 | 0.30 | 0.190 | 0.605 | 14.76 | −285.3 | −1.270 | 0.0263 | 0.45 | −9.23 | 0.765 | 373 | 15.16 | 0.5 |

Table II shows the values of the following properties of STF1 to STF3, which are examples of the signal-transmitting fiber 30: the chromatic dispersion $D_{STF}$, the dispersion slope $S_{STF}$, the dispersion curvature $C_{STF}$, the RDS, and the transmission loss $\alpha_{STF}$.

TABLE II

| | $D_{STF}$ ps/nm/km | $S_{STF}$ ps/nm²/km | $C_{STF}$ ps/nm³/km | RDS $10^{-2}$ nm$^{-1}$ | RDC $10^{-7}$ nm$^{-2}$ | $\alpha_{STF}$ dB/km |
|---|---|---|---|---|---|---|
| STF1 | 4.03 | 0.024 | $4.15 \times 10^{-5}$ | 0.60 | 103.0 | 0.20 |
| STF2 | 4.07 | 0.029 | $-7.96 \times 10^{-7}$ | 0.73 | −1.96 | 0.20 |
| STF3 | 4.06 | 0.035 | $-7.94 \times 10^{-7}$ | 0.86 | −1.96 | 0.20 |

Table III shows the values of the following properties of S1 to S6, which are examples of the optical transmission line having the signal-transmitting fiber 30 and the dispersion compensator 20:

the type of the signal-transmitting fiber (STF);
the type, the length $L_{DCF}$, the overall dispersion $D_{DCFM}$, the insertion loss $Loss_{DCFM}$, and $\cdot L_{eff}$ of the dispersion-compensating fiber (DCF) used in the dispersion compensator; and
the total transmission loss ($Loss_{total}$) and residual dispersion ($D_{res}$) of the optical transmission line.

All the signal-transmitting fibers have a length of 100 km and a loss of 20 dB. In the dispersion compensator, the dispersion-compensating fiber is wound in the shape of a coil having an inner diameter of 120 mm. The term "residual dispersion" means the maximum value of the absolute value of the chromatic dispersion in the C-band (wavelength range: 1530 to 1565 nm).

TABLE III

| | | Dispersion compensator | | | | | |
|---|---|---|---|---|---|---|---|
| STF | DCF | $L_{DCF}$ km | $D_{DCFM}$ ps/nm | $Loss_{DCFM}$ dB | $\gamma L_{eff}$ rad/W | $Loss_{total}$ dB | $D_{res}$ ps/nm |
| S1 | STF1 | DCF1 | 1.456 | −403.6 | 1.533 | 12.04 | 21.53 | ±0.766 |
| S2 | STF2 | DCF2 | 1.182 | −408.2 | 1.283 | 9.27 | 21.28 | ±1.687 |
| S3 | STF2 | DCF3 | 1.307 | −406.9 | 1.397 | 10.66 | 21.40 | ±0.485 |
| S4 | STF2 | DCF4 | 1.514 | −405.6 | 1.586 | 13.13 | 21.59 | ±1.068 |
| S5 | STF3 | DCF5 | 1.568 | −405.7 | 1.488 | 10.37 | 21.49 | ±0.938 |
| S6 | STF3 | DCF6 | 1.628 | −403.4 | 1.808 | 14.84 | 21.81 | ±2.548 |

Figure 6:
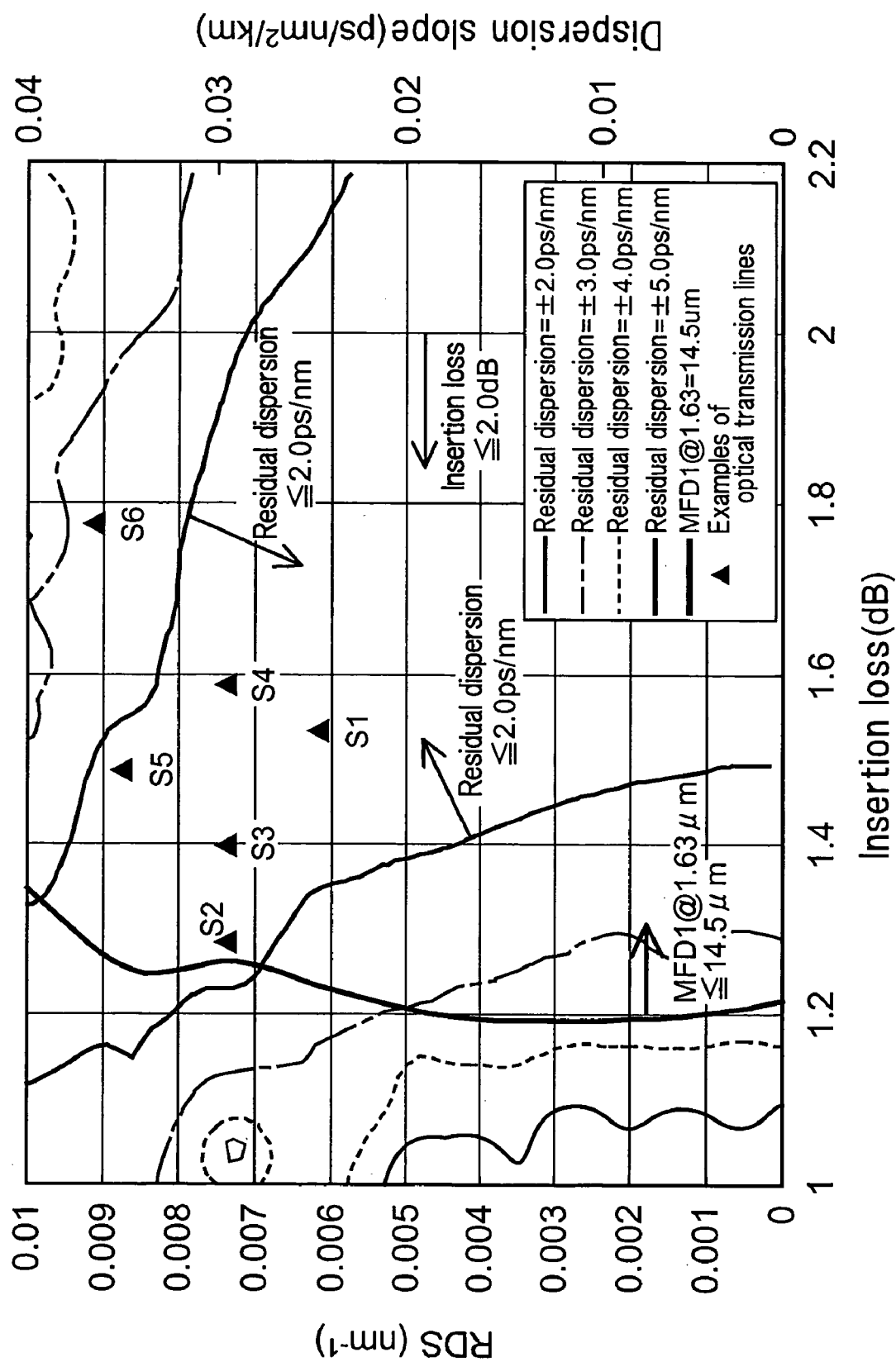
FIG. 6 is a contour diagram showing the residual dispersion of the optical transmission lines that have (a) a signal-transmitting fiber that has a chromatic dispersion of 4.0 ps/nm/km at a wavelength of 1550 nm and that has a length of 100 km and (b) a dispersion compensator in individual examples.

FIG. 6 is a contour diagram showing the residual dispersion of the optical transmission lines that have (a) the signal-transmitting fiber that has a chromatic dispersion of 4.0 ps/nm/km at a wavelength of 1550 nm and that has a length of 100 km and (b) a dispersion compensator according to the present invention. In the diagram, the horizontal axis shows the insertion loss of the dispersion compensator, the left vertical axis shows the RDS of the signal-transmitting fiber at a wavelength of 1550 nm, and the right vertical axis shows the dispersion slope of the signal-transmitting fiber at a wavelength of 1550 nm. This diagram shows the contour lines when the residual dispersion takes a value of ±2.0 ps/nm, ±3.0 ps/nm, ±4.0 ps/nm, and ±5.0 ps/nm. This diagram also shows the contour lines when the mode-field diameter defined by Petermann I is 14.5 μm at a wavelength of 1630 nm. Furthermore, this diagram shows the positions of the optical transmission lines S1 to S6 in the examples. The individual optical transmission lines S1 to S6 in the examples have an absolute value of residual dispersion of at most 4.0 ps/nm at a wavelength of 1550 nm. The dispersion compensator has a mode-field diameter defined by Petermann I of at most 14.5 μm at a wavelength of 1630 nm and an insertion loss of at most 2.0 dB.

The present invention is described above in connection with what is presently considered to be the most practical and preferred embodiments. However, the invention is not limited to the disclosed embodiments, but, on the contrary, is intended to cover various modifications and equivalent arrangements included within the spirit and scope of the appended claims.

The entire disclosure of Japanese patent application 2004-067862 filed on Mar. 10, 2004 including the specification, claims, drawing, and summary is incorporated herein by reference in its entirety.

What is claimed is:

1. A dispersion-compensating fiber comprising:
   (a) a first core region that includes the center axis and that has a refractive index of $n_1$;
   (b) a second core region that surrounds the first core region and that has a refractive index of $n_2$;
   (c) a third core region that surrounds the second core region and that has a refractive index of $n_3$; and
   (d) a cladding region that surrounds the third core region and that has a refractive index of $n_4$;
   the first core region having a refractive-index profile, and the refractive index n1 denoting the maximum value in the profile; the refractive index $n_2$ having the relationship $n_1 > n_2$; the refractive index $n_3$ having the relationship $n_2 < n_3$; the refractive index $n_4$ having the relationship $n_3 > n_4$; the first core region having a relative refractive-index difference of at least 2.0% and at most 3.3% with reference to the refractive index $n_4$; the second core region having a relative refractive-index difference of at least −1.5% and at most −0.2% with the same reference as above; the third core region having a relative refractive-index difference of at least 0.2% and at most 0.5% with the same reference as above; the dispersion-compensating fiber having a figure of merit of at least 200 ps/nm/dB and an absolute value of relative dispersion curvature of at most $10^{-4}$ $nm^{-2}$ both at a wavelength of 1550 nm.

2. A dispersion-compensating fiber as defined by claim 1, the dispersion-compensating fiber having a bending loss of at most 0.1 dB/km at a wavelength of 1630 nm under the condition of a bending diameter of 120 mm.

3. A dispersion-compensating fiber as defined by claim 1, the dispersion-compensating fiber having a relative dispersion slope of at least 0.005 $nm^{-1}$ and at most 0.009 $nm^{-1}$ at a wavelength of 1550 nm.

4. A dispersion-compensating fiber as defined by claim 1, the dispersion-compensating fiber having a mode-field diameter defined by Petermann I of at most 14.5 μm at a wavelength of 1630 nm.

5. A dispersion-compensating fiber as defined by claim 1, wherein:
   (a) the first core region has an outer diameter of 2a;
   (b) the second core region has an outer diameter of 2b;
   (c) the third core region has an outer diameter of 2c;
   (d) the ratio of the outer diameter 2a to the outer diameter 2c, which is a/c, is at least 0.15 and at most 0.30; and (e) the ratio of the outer diameter 2*b* to the outer diameter 2*c*, which is b/c, is at least 0.40 and at most 0.64.

6. A dispersion compensator comprising a dispersion-compensating fiber wound in the shape of a coil, the dispersion-compensating fiber comprising:
   (a) a first core region that includes the center axis and that has a refractive index of $n_1$;
   (b) a second core region that surrounds the first core region and that has a refractive index of $n_2$;
   (c) a third core region that surrounds the second core region and that has a refractive index of $n_3$; and
   (d) a cladding region that surrounds the third core region and that has a refractive index of $n_4$;
the first core region having a refractive-index profile, and the refractive index n1 denoting the maximum value in the profile; the refractive index $n_2$ having the relationship $n_1 > n_2$; the refractive index $n_3$ having the relationship $n_2 < n_3$; the refractive index $n_4$ having the relationship $n_3 > n_4$; the first core region having a relative refractive-index difference of at least 2.0% and at most 3.3% with reference to the refractive index $n_4$; the second core region having a relative refractive-index difference of at least −1.5% and at most −0.2% with the same reference as above; the third core region having a relative refractive-index difference of at least 0.2% and at most 0.5% with the same reference as above; the dispersion-compensating fiber having a figure of merit of at least 200 ps/nm/dB and an absolute value of relative dispersion curvature of at most $10^{-4}$ nm$^{-2}$ both at a wavelength of 1550 nm.

7. A dispersion compensator as defined by claim 6, the dispersion compensator having an insertion loss of at most $-0.005 \cdot D_{DCF} + 0.4$ (dB) at a wavelength of 1550 nm, where $D_{DCF}$ (ps/nm) is the overall dispersion of the dispersion compensator at a wavelength of 1550 nm.

8. A dispersion compensator as defined by claim 6, the dispersion compensator having a relative dispersion slope of at least 0.005 nm$^{-1}$ and at most 0.009 nm$^{-1}$ at a wavelength of 1550 nm.

9. A dispersion compensator as defined by claim 6, wherein the product of the nonlinearity coefficient γ and the fiber's effective length $L_{eff}$ is at most $-0.04 \cdot D_{DCF}$ (rad/W) at a wavelength of 1550 nm, where $D_{DCF}$ (ps/nm) is the overall dispersion of the dispersion compensator at a wavelength of 1550 nm.

10. A dispersion compensator having:
    (a) an insertion loss of at most $-0.004 \cdot D_{DCF} + 0.4$ (dB) at a wavelength of 1550 nm, where $D_{DCF}$ (ps/nm) is the overall dispersion of the dispersion compensator at a wavelength of 1550 nm;
    (b) a relative dispersion slope of at least 0.005 nm$^{-1}$ and at most 0.009 nm$^{-1}$ at a wavelength of 1550 nm; and
    (c) an absolute value of relative dispersion curvature of at most $10^{-4}$ nm$^{-2}$ at a wavelength of 1550 nm.

11. An optical transmission line that is installed in a relay section and that comprises a dispersion-compensating fiber, the dispersion-compensating fiber comprising:
    (a) a first core region that includes the center axis and that has a refractive index of $n_1$;
    (b) a second core region that surrounds the first core region and that has a refractive index of $n_2$;
    (c) a third core region that surrounds the second core region and that has a refractive index of $n_3$; and
    (d) a cladding region that surrounds the third core region and that has a refractive index of $n_4$;
the first core region having a refractive-index profile, and the refractive index n1 denoting the maximum value in the profile; the refractive index $n_2$ having the relationship $n_1 > n_2$; the refractive index $n_3$ having the relationship $n_2 < n_3$; the refractive index $n_4$ having the relationship $n_3 > n_4$; the first core region having a relative refractive-index difference of at least 2.0% and at most 3.3% with reference to the refractive index $n_4$; the second core region having a relative refractive-index difference of at least −1.5% and at most −0.2% with the same reference as above; the third core region having a relative refractive-index difference of at least 0.2% and at most 0.5% with the same reference as above; the dispersion-compensating fiber having a figure of merit of at least 200 ps/nm/dB and an absolute value of relative dispersion curvature of at most $10^{-4}$ nm$^{-2}$ both at a wavelength of 1550 nm.

12. An optical transmission line as defined by claim 11, the optical transmission line further comprising a signal-transmitting fiber connected with the dispersion-compensating fiber;
    the dispersion-compensating fiber having a relative dispersion slope of at least 0.005 nm$^{-1}$ and at most 0.009 nm$^{-1}$ at a wavelength of 1550 nm;
    the signal-transmitting fiber having a chromatic dispersion of at least 3.0 ps/nm/km and at most 5.5 ps/nm/km and a relative dispersion slope of at least 0.005 nm$^{-1}$ and at most 0.009 nm$^{-1}$ both at a wavelength of 1550 nm.

13. An optical transmission line as defined by claim 12, the optical transmission line having an absolute value of overall dispersion of at most $0.01 \cdot Dt \cdot L$ (ps/nm) in a wavelength range of at least 1530 and at most 1565 nm, where Dt (ps/nm/km) is the chromatic dispersion of the signal-transmitting fiber at a wavelength of 1550 nm and L (km) is the length of the signal-transmitting fiber.

14. An optical transmission line as defined by claim 13, wherein the absolute value of overall dispersion is at most $0.005 \cdot Dt \cdot L$ (ps/nm).

* * * * *